United States Patent
Yoshida

(10) Patent No.: US 8,979,049 B2
(45) Date of Patent: Mar. 17, 2015

(54) MOUNT BRACKET SYSTEM

(75) Inventor: Masaru Yoshida, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 13/983,030

(22) PCT Filed: Jan. 18, 2012

(86) PCT No.: PCT/JP2012/000274
§ 371 (c)(1),
(2), (4) Date: Jul. 31, 2013

(87) PCT Pub. No.: WO2012/108127
PCT Pub. Date: Aug. 16, 2012

(65) Prior Publication Data
US 2013/0306816 A1 Nov. 21, 2013

(30) Foreign Application Priority Data
Feb. 7, 2011 (JP) ................. 2011-023603

(51) Int. Cl.
*F16M 13/02* (2006.01)
*F16B 12/34* (2006.01)
(Continued)

(52) U.S. Cl.
CPC .............. *F16M 13/02* (2013.01); *F16B 12/34* (2013.01); *F16B 5/0628* (2013.01); *F16B 21/09* (2013.01)
USPC .................. 248/224.51; 248/297.21; 248/496

(58) Field of Classification Search
CPC .......... F16B 21/09; F16B 12/34; F16M 13/02
USPC ............ 248/317, 224.51, 917, 918, 489, 497, 248/223.41, 224.8, 222.41, 496, 223.51, 248/225.11, 297.21; 211/86.01, 87.01, 192, 211/70.6, 94.01, 90.02; 403/186, 254, 353, 403/398
See application file for complete search history.

(56) References Cited

U.S. PATENT DOCUMENTS 4,128,354 A * 12/1978 Amrogowicz ................ 403/186
4,558,839 A * 12/1985 Kaplan et al. ................ 248/542
(Continued)

FOREIGN PATENT DOCUMENTS

JP 11-201386 A 7/1999
JP 2000-166747 A 6/2000
(Continued)

OTHER PUBLICATIONS

International Search Report issued in International Application No. PCT/JP2012/000274 with Date of mailing of the international search report Apr. 17, 2012.

*Primary Examiner* — Tan Le
(74) *Attorney, Agent, or Firm* — McDermott Will & Emery LLP

(57) ABSTRACT

A mount bracket system (20) includes a wall-mount part (2) including an axis portion (4) with a cylindrical column shape and a stopper (5) provided at the axis portion and having a width larger than a diameter of the axis portion (4); and a wall-mount frame (3) including a path (7) continuing from an opening (7*a*) and having a width larger than the diameter of the axis portion (4) and smaller than the width of the stopper (5). The path includes a projection (7*b*) projecting inward from an edge of the path (7), and the projection (7*b*) is located nearer the opening (7*a*) than the axis portion (4) of the wall-mount part (2) is when the axis portion (4) is retained at a retaining point of the wall-mount frame (3).

2 Claims, 6 Drawing Sheets

(51) Int. Cl.
*F16B 5/06* (2006.01)
*F16B 21/09* (2006.01)

(56) References Cited

U.S. PATENT DOCUMENTS

| | | | | |
|---|---|---|---|---|
| 5,297,486 | A * | 3/1994 | Herrmann et al. | 108/108 |
| 5,803,655 | A * | 9/1998 | Furuya | 403/398 |
| 6,123,314 | A * | 9/2000 | Steele | 248/681 |
| 6,425,563 | B1 * | 7/2002 | Mihailoff | 248/245 |
| 6,892,892 | B2 * | 5/2005 | Wang | 210/503 |
| 6,892,992 | B2 * | 5/2005 | Donahue | 248/201 |
| 7,611,109 | B2 * | 11/2009 | Lin | 248/222.52 |
| 8,245,992 | B2 * | 8/2012 | Matsui | 248/317 |
| 2008/0083865 | A1 | 4/2008 | Matsui | |
| 2008/0237434 | A1 * | 10/2008 | Lin | 248/497 |

FOREIGN PATENT DOCUMENTS

| | | |
|---|---|---|
| JP | 2006-330463 A | 12/2006 |
| JP | 2008-069937 A | 3/2008 |
| JP | 2011-033086 A | 2/2011 |

* cited by examiner (a)

(b)

(a)

(b)

MOUNT BRACKET SYSTEM

RELATED APPLICATIONS

This application is the U.S. National Phase under 35 U.S.C. §371 of International Application No. PCT/JP2012/000274, filed on Jan. 18, 2012, which in turn claims the benefit of Japanese Application No. 2011-023603, filed on Feb. 7, 2011, the disclosures of which Applications are incorporated by reference herein.

TECHNICAL FIELD

The present disclosure relates to mount bracket systems, and more specifically, to a mount bracket system configured to anchor a target object such as a display device to a wall-mount frame on a wall through a wall-mount part.

BACKGROUND ART

Recently, progress has been made in slimming down of display devices such as television sets. The slimming down of display devices has enabled the display devices to be hung on walls by means of mount bracket systems. The mount bracket system is a system which includes a wall-mount part and a wall-mount frame and is configured to hang, e.g., a display device on a wall by securing the wall-mount part on the backside of the display device and by anchoring the wall-mount part to the wall-mount frame mounted on the wall. Many houses and commercial facilities actually have display devices mounted on walls in this manner.

Patent Document 1 describes a conventional mount bracket system. The conventional mount bracket system for a display device will be described below with reference to FIGS. 10 and 11.

FIG. 10 illustrates how a wall-mount part included in the conventional mount bracket system for a display device is secured to a target object. The wall-mount part 100 includes an axis portion 100a and a stopper 100b provided at an end of the axis portion 100a. As shown in FIG. 10, the wall-mount part 100 is secured to and projects from the target object 200.

FIG. 11 illustrates how the wall-mount part is anchored to a wall-mount frame in the conventional mount bracket system for a display device. The wall-mount frame 300 includes a path 400 which is a groove bends at an intermediate point. The wall-mount part 100 is anchored to the wall-mount frame 300 by inserting the axis portion 100a of the wall-mount part into the path 400.

It is described that, in the conventional mount bracket system for a display device, the intermediate point at which the path 400 bends makes it less likely that the wall-mount part 100 is moved even by an upward impact.

CITATION LIST

Patent Document

PATENT DOCUMENT 1: Japanese Patent Publication No. H11-201386

SUMMARY OF THE INVENTION

Technical Problem

However, in view of the fact that the wall-mount part 100 has a circular cross section as illustrated in FIG. 11, when an upward force is applied to the target object, a collision between the axis portion 100a of the wall-mount part 100 and an upper edge portion 500 of the path 400 causes a resultant force acting on the axis portion 100a and having a horizontal component.

Thus, the conventional mount bracket system is disadvantageous in that the target object may be easily moved in a diagonally upward direction by an upward impact.

It is therefore an object of the present disclosure to provide a mount bracket system which is capable of anchoring a target object such that the target object is less likely to be moved by an upward impact.

Solution to the Problem

To achieve the object, a mount bracket system of the present disclosure is configured such that a path through which an axis portion of a wall-mount part included in the mount bracket system passes has a projection, and the projection is located nearer an opening of the path than a retaining point for the axis portion is, and projects inward from an edge of the path.

Specifically, the mount bracket system of the present disclosure includes: a wall-mount part including an axis portion with a cylindrical column shape, and a stopper provided at the axis portion and having a width larger than a diameter of the axis portion; and a wall-mount frame including a path continuing from an opening and having a width larger than the diameter of the axis portion and smaller than the width of the stopper, wherein the path includes a projection projecting inward from an edge of the path, and the projection is located nearer the opening than the axis portion of the wall-mount part is when the axis portion is retained at a retaining point of the wall-mount frame.

Advantages of the Invention

In the mount bracket system of the present disclosure, even if an upward force is applied to a target object, the projection provided on the edge of the path and located on a side adjacent to the opening controls movements of the wall-mount part. Consequently, it is possible to prevent the target object from becoming detached from the wall-mount frame.

BRIEF DESCRIPTION OF THE DRAWINGS

FIG. 1(a) is a back view, and FIG. 1(b) is a cross-sectional view taken along the line Ib-Ib in FIG. 1(a).

FIG. 2(a) is a side view, and FIG. 2(b) is a cross-sectional view taken along the line IIb-IIb in FIG. 2(a).

FIG. 3 illustrates, with the line of operational flow, how the target object is anchored to the wall-amount frame through the wall-amount part.

FIGS. 6(a) and 6(b) illustrate how the axis portion of the wall-amount part moves in the path of the frame.

FIG. 10 illustrates a wall-mount part projecting from a target object in the conventional mount bracket system.

DESCRIPTION OF EMBODIMENTS

Embodiment

Figure 1:
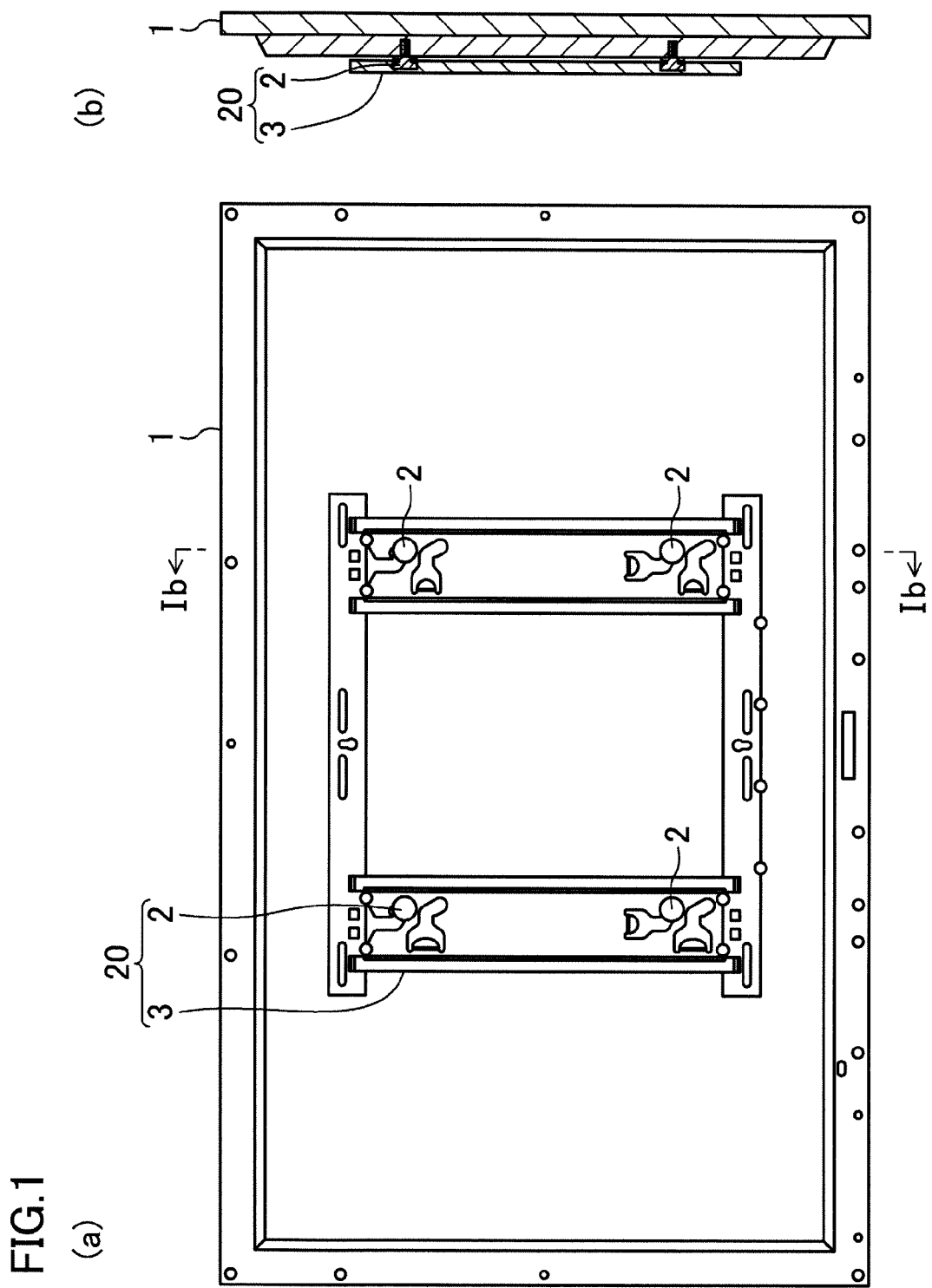
FIG. 1(a) and FIG. 1(b) illustrate a mount bracket system according to an embodiment of the present disclosure and a target object anchored by means of the mount bracket system.
Figure 2:
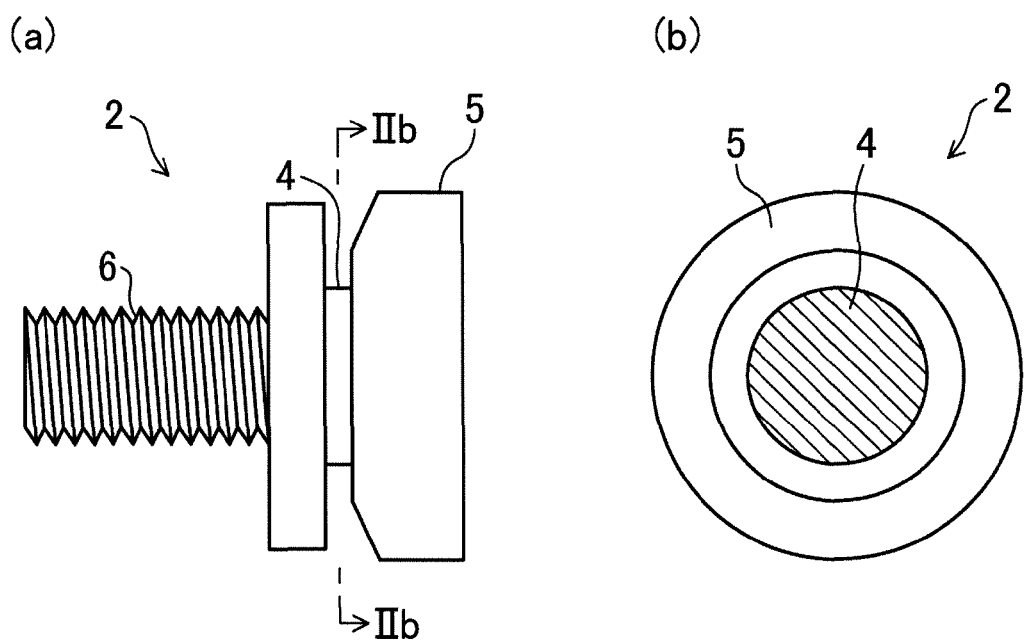
FIG. 2(a) and FIG. 2(b) illustrate a wall-amount part included in the mount bracket system according to the embodiment of the present disclosure.

A mount bracket system according to an embodiment of the present disclosure will be described below with reference to FIGS. 1-6.

<Configuration of Mount Bracket System>

A configuration of the mount bracket system is now described.

First, the overall configuration of the mount bracket system is described with reference to FIG. 1(a).

As illustrated in FIG. 1(a), the mount bracket system 20 includes a plurality of wall-mount parts 2 secured to the backside of a target object 1 and a wall-mount frame 3 to which the wall-mount parts 2 are anchored.

Each of the constituent components of the mount bracket system 20 is outlined below. The wall-mount parts 2 include four wall-mount parts 2 secured to and projecting from the backside of the target object 1. The wall-mount frame 3 is secured on a wall (not shown). The wall-mount parts 2 will be detailed later.

The target object 1 may be any object which is hung on a wall for use or for viewing. A display device such as a plasma display panel is exemplified as the target object 1 in this embodiment.

Referring to FIG. 1(b), how the target object 1 is anchored to the wall-mount frame 3 is described next. As illustrated in FIG. 1(b), each of the wall-mount parts 2 disposed in an associated one of grooves formed in the wall-mount frame 3 in a state where the target object 1 is anchored by means of the mount bracket system 20. In this manner, the target object 1 is anchored to the wall-mount frame 3 through the plurality of wall-mount parts 2.

The wall-mount parts 2 are described in detail with reference to FIGS. 2(a) and 2(b). As illustrated in FIGS. 2(a) and 2(b), each of the wall-mount parts 2 includes an axis portion 4, a stopper 5, and a screw portion 6. The axis portion 4 is a resin molding and has a cylindrical column shape. The stopper 5 is a resin molding and has a substantially cylindrical column shape. In this embodiment, the axis portion 4 and the stopper 5 are molded in one piece using a resin material.

As clearly illustrated in FIGS. 2(a) and 2(b), the stopper 5 has a width larger than the diameter of the axis portion 4. When the stopper 5 has a substantially cylindrical column shape as in this embodiment, the width of stopper 5 refers to the diameter of the column shape. The stopper 5 may have a shape other than the cylindrical column shape, and it is sufficient, in such a case, that the stopper 5 has a width larger than the diameter of the axis portion 4. This configuration is necessary to prevent the wall-mount portion 2 having the axis portion 4 inserted into the groove (which will be detailed later) formed in the wall-mount frame 3 from becoming detached from the wall-mount frame 3. The screw portion 6 is made of, e.g., a metal rod, and is bonded such that the longitudinal axis of the screw portion 6 is coincident with the axial direction of the axis portion 4 and the stopper 5. The screw portion 6 has a thread groove formed thereon. The screw portion 6 is used to secure the axis portion 4 and stopper 5 to the target object 1. The backside of the target object 1 has threaded holes each corresponding to the screw portion 6. Each of the wall-mount parts 2 is secured to the target object 1 by screwing the screw portion 6 into an associated one of the threaded holes of the target object 1.

The method for anchoring the target object 1 to the wall-mount frame 3 through the wall-mount parts 2 is described next.

Figure 3:
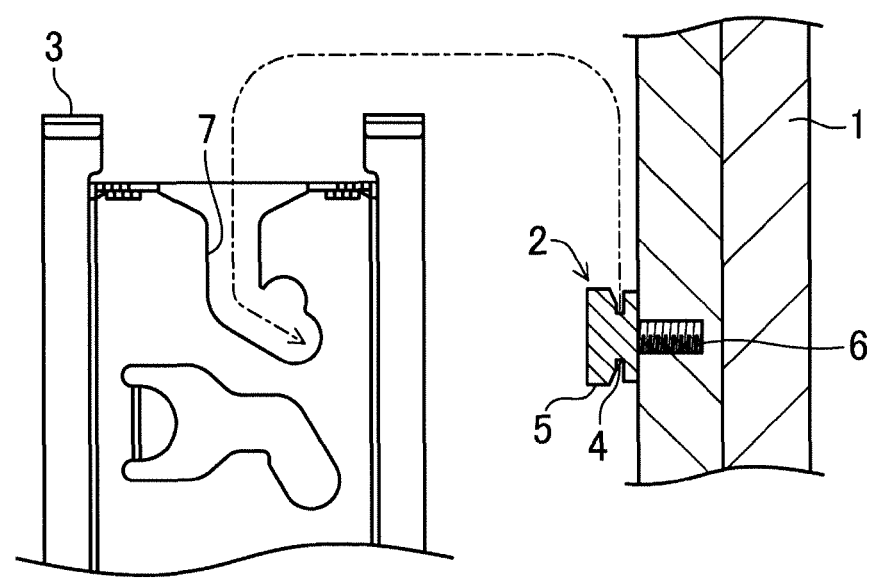
FIG. 3 is a schematic view of part of the mount bracket system according to the embodiment of the present disclosure.

FIG. 3 illustrates, with a line of operational flow, how the target object 1 is anchored to the wall-mount frame 3 through the wall-mount parts 2 by using the mount bracket system of this embodiment. Specifically, the right half of FIG. 3 illustrates a cross section of a lateral side of the target object 1 to which the wall-mount part 2 is secured, and the left half of FIG. 3 illustrates the wall-mount frame 3, as viewed from front, having a path 7 which is one of the grooves formed in the wall-mount frame 3.

The path 7 is formed by cutting out a part of the wall-mount frame 3 by means of, e.g., pressing. The path 7 has a width which is larger than the diameter of the axis portion 4 and smaller than the width of the stopper 5. The wall-mount frame 3 has a convex shape having therein a hollow space having a depth, and accordingly, the path 7 adjoins to the hollow space having the depth. This configuration enables the axis portion 4 to be inserted in the path 7. As indicated by the arrow (the line of operational flow) in FIG. 3, the axis portion 4 of the wall-mount part 2 is caused to pass through the path 7 of the wall-mount frame 3. The path 7 has a lower end which retains the axis portion 4.

Although the path 7 of this embodiment has the lower end which is closed, the path 7 may have a narrowing width leading to a lower end having a width smaller than the diameter of the axis portion 4 such that the lower end retains the axis portion 4. In sum, the path 7 is required to have a portion where the axis portion 4 is retained without moving further in the vertical direction (i.e. in the downward direction). Any portion of the path 7 which satisfies this requirement and retains the axis portion 4 is referred to as the lower end of the path 7. In this manner, the target object 1 is anchored to the wall-mount frame 3 through the wall-mount parts 2.

Figure 4:
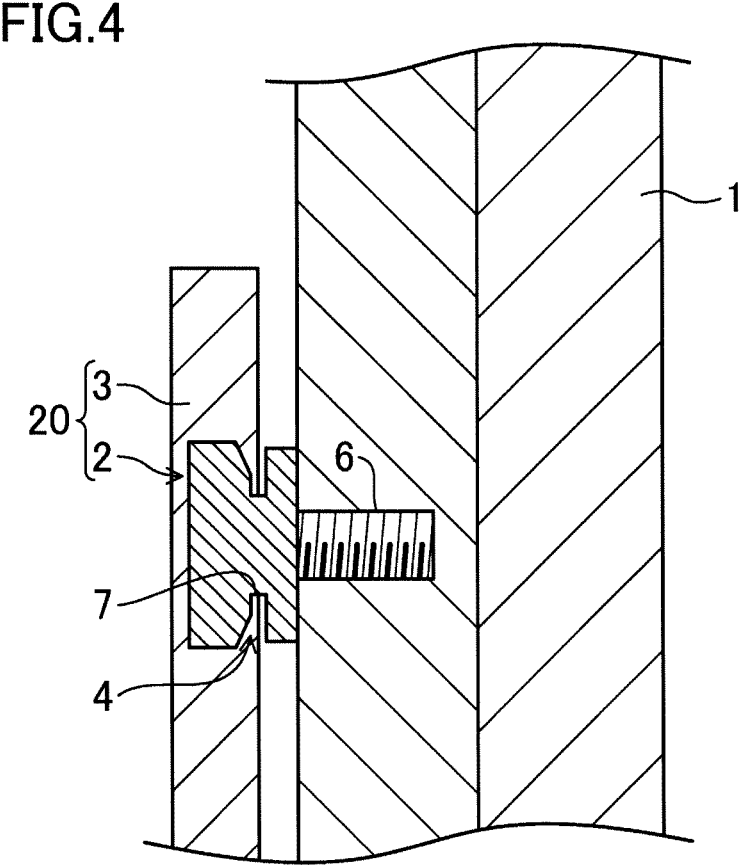
FIG. 4 is a cross-sectional view illustrating part of a lateral side of the target object anchored by means of the mount bracket system of the embodiment of the present disclosure.

FIG. 4 illustrates a cross section of a lateral side of the target object 1 anchored by means of the mount bracket system 20 according to this embodiment. Each of the wall-mount parts 2 is secured to the target object 1 through the screw portion 6. The axis portion 4 of each of the wall-mount parts 2 is supported in the path 7 at the lower end which serves as a retaining point, resulting in that the wall-mount parts 2 are anchored to the wall-mount frame 3. Thus, the target object 1 is anchored to the wall-mount frame 3 through the wall-mount parts 2.

It is presumed that an operator anchors the target object 1 to a wall in the following manner. First, the operator secures the wall-mount frame 3 to a desired portion of the wall. Next, the operator screws the wall-mount parts 2 into the target object 1. The operator, then, lifts up the target object 1 and fits the axis portions 4 of the wall-mount parts 2 into the paths 7 of the wall-mount frame 3 in a simultaneous manner.

Upon inserting the axis portions 4 into the paths 7, the weight of the target object 1 causes the axis portions 4 to move to the lower ends of the paths 7. This is because each of the paths 7 includes a vertical path and a path extending in a diagonally downward direction continuously from the vertical path. Here, the path extending in a diagonally downward direction refers to at least part of the path 7 obliquely intersects the vertical direction when the system is in use.

<Shape, Functions, and Advantages of Path>

The shape of each of the paths 7 formed in the wall-mount frame 3 used in the mount bracket system of this embodiment will be described below in detail, together with the functions and advantages of the paths.

First, the shape of the paths 7 formed in the wall-mount frame 3 is described in detail.

Figure 5:
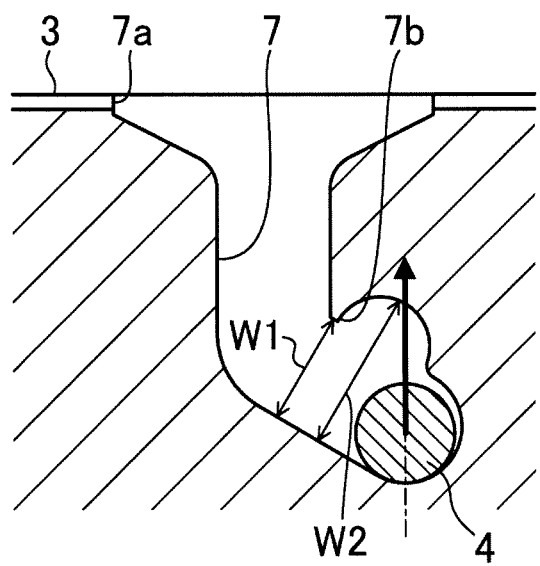
FIG. 5 is an enlarged front view illustrating the shape of a path formed in the wall-mount frame included in the mount bracket system of the embodiment of the present disclosure.
Figure 6:
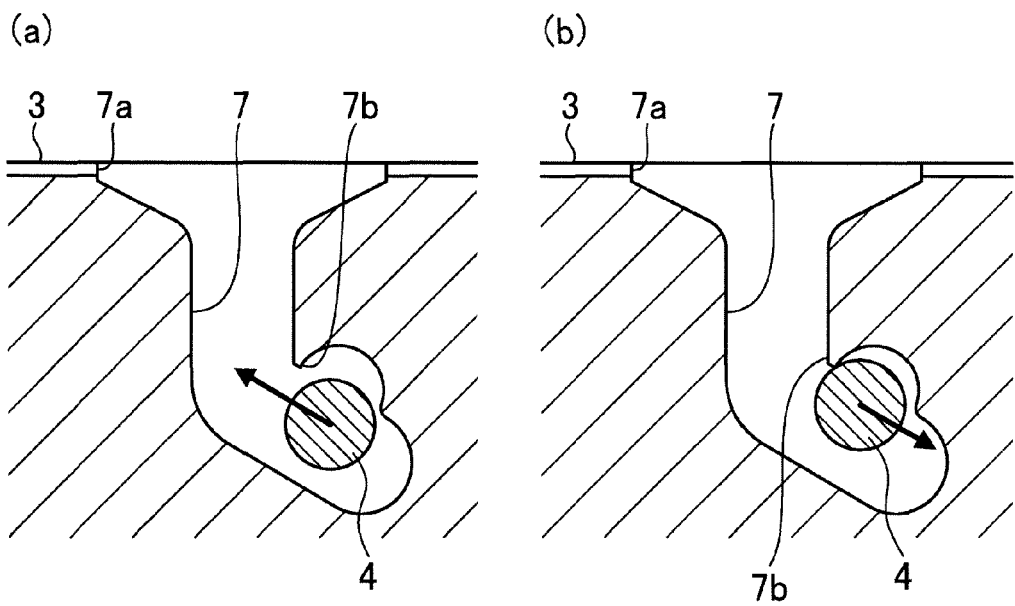
FIG. 6(a) and FIG. 6(b) are enlarged front views of the wall-amount frame included in the mount bracket system of the embodiment of the present disclosure.

FIG. 5 is an enlarged view of one of the paths 7 which are the grooves formed in the wall-mount frame 3 used in the mount bracket system of this embodiment. As shown in FIG. 5, the path 7 has an opening 7a which opens upwardly in the vertical direction of the wall-mount frame 3. From the opening 7a, the path 7 decreases in width downwardly in a gradual manner to have its width substantially equal to a width W1. The width W1 is larger than the diameter of the axis portion 4. The path 7 extends in the vertical direction, and then bends in a diagonally downward direction from a bend portion. Part of the edge of the path 7 which is located close to the bend portion is cut out such that the width of the path 7 increases from the width W1 to a width W2, inwardly with respect to the bend portion. Consequently, the path 7 has a projection 7b formed at the point from which the path 7 increases in width from the width W1 to the width W2 that is larger than width W1. Thus, the projection 7b projects from the upper edge of the path 7 toward the inside of the path 7. The projection 7b is provided to control upward movements of the axis portion 4.

As descried above, upon insertion of the wall-mount part 2 into the opening 7a of the path 7 of the wall-mount frame 3, the axis portion 4 of the wall-mount part 2 is moved by gravity and reaches the lower end of the path 7, where the axis portion 4 is retained. When the axis portion 4 is retained, the projection 7b formed in the path 7 is located at an upper point of the path 7 relative to the vertical line passing through the center point of the axis portion 4. Here, the upper point of the path 7 refers to a point which is nearer the opening 7a than the axis portion 4 which is retained at the lower end of the path 7 is.

Here, it is appropriate to form the projection 7b such that the projection 7b comes into collision with a surface portion of the axis portion 4 corresponding to the fourth quadrant of the four quadrants divided by the vertical and horizontal lines passing through the center point of the axis portion 4, in other words, with a surface portion of the axis portion 4 opposite to the opening 7a.

The projection 7b, which is formed by cutting out part of the wall-mount frame 3, and the wall-mount frame 3 are made of the same material. This configuration in which the projection 7b and the wall-mount frame 3 are made of the same material is advantageous in both of the strength of the projection 7b and machining costs.

The advantages obtained from the shape of the paths 7 formed in the wall-mount frame 3 will be described next.

When a force acting in a vertically upward direction (in the direction indicated by the arrow in FIG. 5) is applied to the axis portion 4 which is in the state shown in FIG. 5, the axis portion 4 of the wall-mount part 2 moves along the edge of the path 7 located upward in a vertically direction (hereinafter may be referred to simply as "located upward"). This is because a collision between an upper edge of the path 7 and the axis portion 4 generates a resultant force acting toward the opening 7a of the path 7 (hereinafter may be referred to simply as "toward upper left").

Referring FIGS. 6(a) and 6(b), how the axis portion 4 moves is described. Here, the axis portion 4 moves from the position illustrated in FIG. 6(a) to the position illustrated in FIG. 6(b). In each of FIGS. 6(a) and 6(b), the arrow extending from the center point of the axis portion 4 indicates the direction of an applied force.

As illustrated in FIG. 6(a), first, the axis portion 4 moves upward, that is, the axis portion 4 performs a movement which causes the wall-mount part 2 to become detached from the wall-mount frame 3.

In this embodiment, however, an upper left portion of the axis portion 4 comes into collision with the projection 7b as illustrated in FIG. 6(b) when the axis portion 4 continues to move. The reason for the collision between the upper left portion of the axis portion 4 and the projection 7b is that the projection 7b is located at the upper point of the path 7 relative to the vertical line passing through the center point of the axis portion 4 (i.e., located nearer the opening 7a than the vertical line is). Accordingly, the collision generates a repulsive force acting toward lower right (a force acting opposite to the opening 7a). The axis portion 4 of the wall-mount part 2 is consequently moved to the point where the axis portion 4 is retained in the wall-mount frame 3 again. As a result, even if a force acting in the vertically upward direction is applied to the axis portion 4, the wall-mount part 2 does not become detached from the wall-mount frame 3. That is, even if a force acting in the vertically upward direction is applied to the target object 1, the target object 1 does not become detached from the wall-mount frame 3.

<First Variation>

A first variation of this embodiment will be described below with reference to FIGS. 7 and 8.

Figure 7:
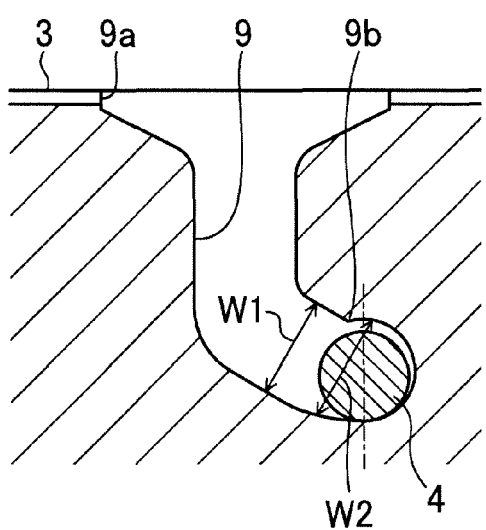
FIG. 7 is an enlarged front view illustrating the shape of a path formed in a wall-mount frame included in a mount bracket system according to a first variation of the embodiment of the present disclosure.

FIG. 7 is an enlarged view of one of paths 9 formed in a wall-mount frame 3 used in a mount bracket system according to the first variation. As illustrated in FIG. 7, the path 9 has an opening 9a which opens upwardly in the vertical direction of the wall-mount frame 3. From the opening 9a, the path 9 decreases in width downwardly in a gradual manner to have its width substantially equal to a width W1. The width W1 is larger than the diameter of the axis portion 4. The path 9 extends in the vertical direction, and then bends in a diagonally downward direction.

In the path 9 of the this variation, the lower end which is the retaining point for the axis portion 4 has an upper edge which is cut out such that the width of the path 9 increases from the width W1 to a width W2. Consequently, a projection 9b is formed at the point where the width of the path 9 increases from the width W1 to the width W2 that is larger than the width W1. Thus, the projection 9b projects from the upper edge of the path 9 toward the inside of the path 9. The projection 9b is provided for controlling upward movements of the axis portion 4.

As described above, upon insertion of the wall-mount part 2 into the opening 9a of the path 9 of the wall-mount frame 3, the axis portion 4 of the wall-mount part 2 is moved by gravity and reaches the lower end of the path 9, where the axis portion 4 is retained. When the axis portion 4 is retained, the projection 9b formed in the path 9 is located at an upper point of the path 9 relative to the vertical line passing through the center point of the axis portion 4.

The projection 9b, which is formed by cutting out the wall-mount frame 3, and the wall-mount frame 3 are made of the same material.

A difference between the path 9 and the path 7 is described next.

The path 7 and path 9 each of which is formed in the corresponding wall-mount frame 3 share a commonality: The projections 7b and 9b are each located at the corresponding upper point of the path 7 or 9 relative to the vertical line passing through the center point of the axis portion 4. On the other hand, the path 9 of this variation is different from the path 7 in that the projection 9b is located above (directly above) the axis portion 4. That is, the projection 9b is closer to the axis portion 4 than the projection 7b is.

With this configuration, the axis portion 4 only slightly moves even if a force having an upward component is applied to the axis portion 4. Referring to FIG. 6(a), when an upward force is applied to the axis portion 4 retained in the path 7, the force and the upper edge of the path 7 cause a resultant force acting on the axis portion 4, and the axis portion 4 moves along the edge of the path 7.

Figure 8:
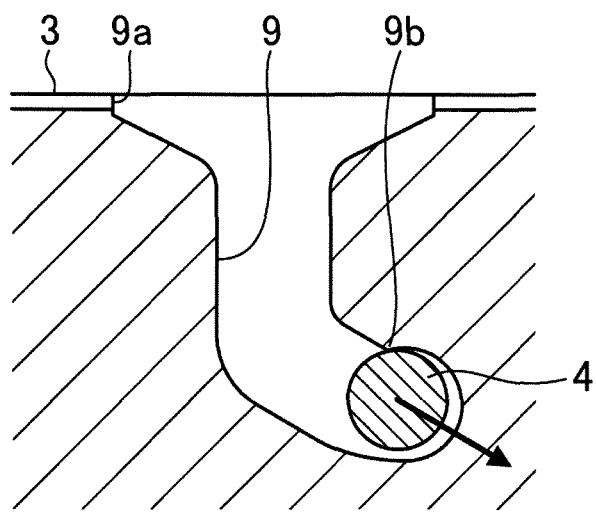
FIG. 8 is an enlarged front view illustrating how an axis portion of a wall-mount part moves in the path formed in the wall-mount frame included in the mount bracket system according to the first variation of the embodiment of the present disclosure.

On the other hand, when an upward force is applied to the axis portion 4 in the path 9 illustrated in FIG. 7, the projection 9b located directly above the axis portion 4 causes a resultant forcer to act in the downward direction as indicated by the arrow in FIG. 8. Thus, the axis portion 4 is less likely to move upward along the edge of the path 9. As a result, this variation has an advantage that the target object 1 scarcely rattles even if an upward force is applied to the target object 1.

<Second Variation>

A second variation of this embodiment will be described below with reference to FIG. 9.

Figure 9:
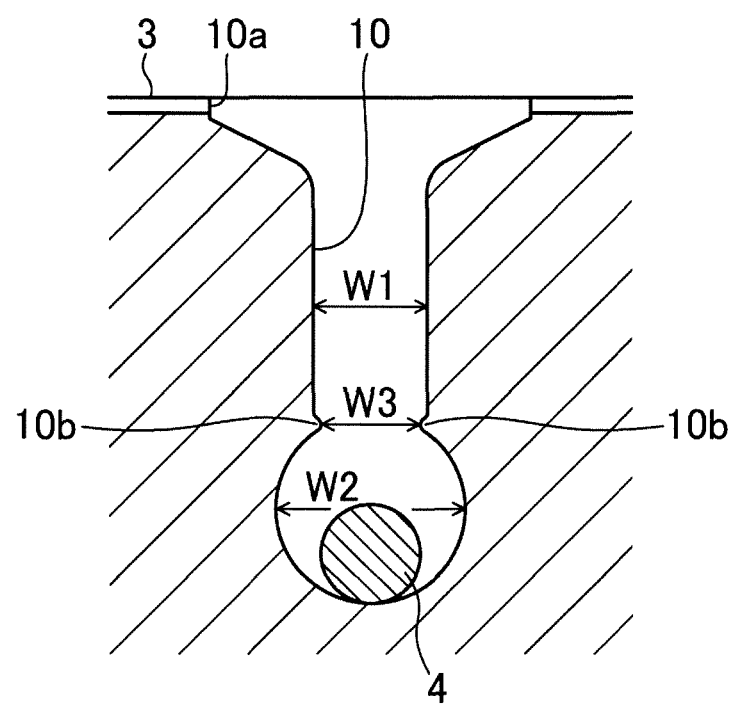
FIG. 9 is an enlarged view illustrating the shape of a path formed in a wall-mount frame included in a mount bracket system according to a second variation of the embodiment of the present disclosure.
Figure 10:
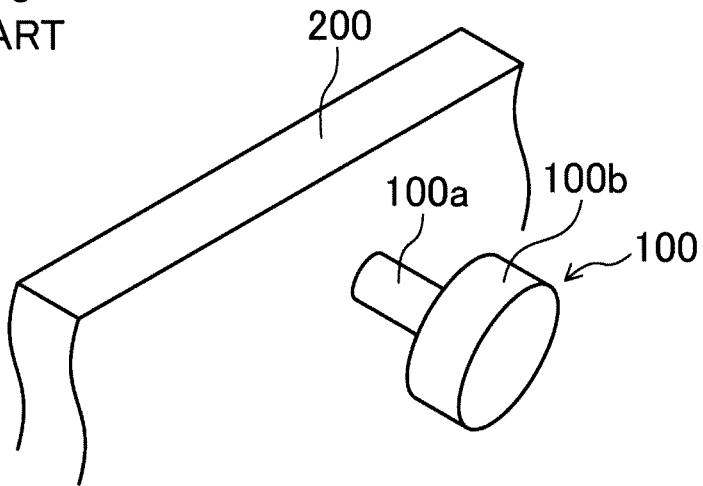
FIG. 10 is a perspective view of part of a conventional mount bracket system.
Figure 11:
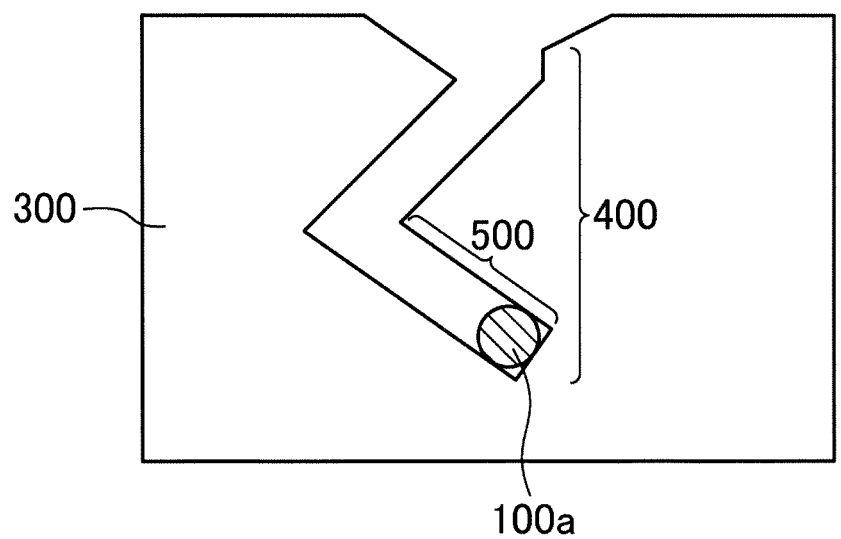
FIG. 11 is an enlarged front view illustrating the wall-amount part anchored to a wall-amount frame included in the conventional mount bracket system.

FIG. 9 is an enlarged view of one of paths 10 formed in a wall-mount frame 3 used in a mount bracket system according to the second variation. As illustrated FIG. 9, the path 10 has an opening 10a which opens upwardly in the vertical direction of the wall-mount frame 3. From the opening 10a, the path 10 decreases in width downwardly in a gradual manner to have its width substantially equal to a width W1. The width W1 is larger than the diameter of the axis portion 4.

The path 10 of this variation extends parallel to the vertical direction. Further, the lower end of the path 10 serving as the retaining point for the axis portion 4 is formed such that the distance between both lateral sides of the lower end is equal to a width W2. More specifically, the lower end of the path 10 is formed by cutting out the edge in such a manner that the width of the path 10 increases from the width W1 to the width W2 through projections 10b defining a width W3 which is smaller than the width W1. The width W3 is larger than the diameter of the axis portion 4. Thus, the two projections 10b each project toward the inside of the path 10 from the edge above the retaining point where the axis portion 4 is retained. Accordingly, the projections 10b can control upward movements of the axis portion 4. Although it is not necessarily required to provide the projections 10b at two points, the projections 10b provided at two points are more preferable than one projection 10b provided at a single point.

As described above, upon insertion of the wall-mount part 2 into the opening 10a of the path 10 of the wall-mount frame 3, the axis portion 4 of the wall-mount part 2 is moved by gravity and reaches the lower end of the path 10, where the axis portion 4 is retained.

The projections 10b, which are formed by cutting out the wall-mount frame 3, and the wall-mount frame 3 are made of the same material.

With this configuration, in most cases, an upper left portion or un upper right portion of the axis portion 4 comes into collision with the projections 10b even if a force having an upward component is applied to the axis portion 4. The reason for the collision between the axis portion 4 and the projections 10b is that the projections 10b are located above the axis portion 4 retained at the lower end of the path 10 and the axis portion 4 is retained between the cutout portions which defining the width W2 that is larger than the with W3. Although the path 10 extends in the vertical direction, since the axis portion 4 is retained at the lower end whose both sides define the width W2 larger than the width W3, it is extremely rare a force is applied in such a manner that all of the axis portions 4 provided at four points move upward without coming into collision with both projections 10b of the paths 10.

When the axis portion 4 comes into collision with the projections 10b, a repulsive force acting downwardly (acting opposite to the opening 10a) is generated, as described above. The axis portion 4 of the wall-mount part 2 is consequently moved to the point where the axis portion 4 is retained in the wall-mount frame 3 again. As a result, even if force acting in the vertically upward direction is applied to the axis portion 4, the wall-mount part 2 does not become detached from the wall-mount frame 3.

Summary of Embodiment and Variations

According to this embodiment and the variations thereof, even if an upward force is applied to the target object 1, the configuration of the wall-mount frame 3 controls the movement of the wall-mount parts 2. As a result, it is possible to prevent the target object 1 from becoming detached from the wall-mount frame 3.

Any article such as various electrical products, heavy objects, and exhibits may be selected as the target object 1. The plasma display panel has been described above as an example. For example, a liquid crystal display panel, a clock, or a painting may be selected as the target object.

However, the present disclosure is particularly useful when a display device is selected as the target object as in this embodiment. Since the present disclosure is resistant to upward impacts applied from below the target object, the present disclosure is useful for installing the target object within arm's reach of a user.

Since the present disclosure allows a target object to move in a specific direction other than the vertical direction, the present disclosure is useful for hanging a target object in a detachable manner.

The stability of the present disclosure increases in proportion to the weight of a target object when the target object is stationary. Therefore, the present disclosure is effective for a heavy object.

In view of the above three advantages of the present disclosure, it is preferable to adopt a display device as the target object.

INDUSTRIAL APPLICABILITY

The mount bracket system of the present disclosure is useful as a system for anchoring a wall-hang heavy object such as a display device to a wall.

DESCRIPTION OF REFERENCE CHARACTERS

1 Target object
2 Wall-mount part

3 Wall-mount frame
4 Axis portion
5 Stopper
6 Screw portion
7 Path
7a Opening
7b Projection
9 Path
9a Opening
9b Projection
10 Path
10a Opening
10b Projection
20 Mount bracket system

The invention claimed is:

1. A mount bracket system for a display device, the mount bracket system comprising:
    a wall-mount part for the display device, the wall-mount part including an axis portion with a cylindrical column shape, and a stopper provided at the axis portion and having a width larger than a diameter of the axis portion; and
    a wall-mount frame including a path continuing straight downwardly from an opening and having a width larger than the diameter of the axis portion and smaller than the width of the stopper,
    wherein
    the path includes a projection projecting inward from an edge of the path,
    the projection is located nearer the opening than the axis portion of the wall-mount part is when the axis portion is retained in a cylindrical portion of the wall-mount frame,
    the path extends diagonally relative to a vertical direction between the opening and the cylindrical portion, and
    the cylindrical portion continuing downwardly from the projection, defining a gap larger than the width of the path, and configured to support the axis portion.

2. The mount bracket system of claim 1, wherein the projection is located above the axis portion of the wall-mount part when the axis portion is retained in the cylindrical portion of the wall-mount frame.

* * * * *